US011847788B2

(12) United States Patent
Lu et al.

(10) Patent No.: US 11,847,788 B2
(45) Date of Patent: *Dec. 19, 2023

(54) DEPTH PROCESSOR

(71) Applicant: HIMAX TECHNOLOGIES LIMITED, Tainan (TW)

(72) Inventors: Hsueh-Tsung Lu, Tainan (TW); Ching-Wen Wang, Tainan (TW); Cheng-Che Tsai, Tainan (TW); Wu-Feng Chen, Tainan (TW)

(73) Assignee: HIMAX TECHNOLOGIES LIMITED, Tainan (TW)

( * ) Notice: Subject to any disclaimer, the term of this patent is extended or adjusted under 35 U.S.C. 154(b) by 282 days.

This patent is subject to a terminal disclaimer.

(21) Appl. No.: 17/231,026

(22) Filed: Apr. 15, 2021

(65) Prior Publication Data

US 2022/0335634 A1 Oct. 20, 2022

(51) Int. Cl.
*G06T 7/50* (2017.01)
*G06T 7/90* (2017.01)
*G06T 7/60* (2017.01)
*G06V 10/25* (2022.01)

(52) U.S. Cl.
CPC ............... *G06T 7/50* (2017.01); *G06T 7/60* (2013.01); *G06T 7/90* (2017.01); *G06V 10/25* (2022.01); *G06T 2207/10024* (2013.01); *G06T 2207/30201* (2013.01)

(58) Field of Classification Search
CPC .... G06T 7/50; G06T 7/60; G06T 7/90; G06T 2207/10024; G06T 2207/30201; G06V 10/25
USPC ........................................... 382/106
See application file for complete search history.

(56) References Cited

U.S. PATENT DOCUMENTS

| 10,198,792 | B2* | 2/2019 | Lai .......................... G06T 5/002 |
| 11,475,581 | B2* | 10/2022 | Lu .......................... G06V 40/161 |
| 2016/0042519 | A1* | 2/2016 | Wu .......................... G06T 7/50 345/419 |
| 2018/0061069 | A1* | 3/2018 | Higaki ....................... G06T 7/50 |
| 2021/0019892 | A1* | 1/2021 | Zhou ....................... G06V 40/162 |

* cited by examiner

*Primary Examiner* — Gabriel I Garcia
(74) *Attorney, Agent, or Firm* — JCIPRNET

(57) ABSTRACT

A depth processor including a region of interest determination circuit and a depth decoder is provided. The region of interest determination circuit is configured to determine a size of a region of interest of an input image. The depth decoder is coupled to the region of interest determination circuit and configured to generate a depth map of the input image according to a filter size. The filter size is set according to the size of the region of interest of the input image.

5 Claims, 3 Drawing Sheets

| ROI size | Estimated Distance | Filter Size (Patch Size) |
|---|---|---|
| 10 | 1000mm | 3x3 |
| 20 | 800mm | 5x5 |
| 30 | 600mm | 7x7 |
| ... | ... | ... |
| 100 | 200mm | 17x17 |

FIG. 4

DEPTH PROCESSOR

BACKGROUND

Technical Field

The invention relates to a processor, more specifically, to a depth processor.

Description of Related Art

As an application of facial recognition system develops, various sensors for detecting three-dimensional images of faces are flourishing. Taking a structured light technology for example, structured lights are projected to an object by using a projector, and sensors detect a projection image. Therefore, a triangle geometry structure among the object, the projector and the sensors can be obtained, and a depth map can be further generated according to the triangle geometry structure and a deformation displacement of the projection image. In addition, time of flight or phase difference of an output light and a receiving light is also widely applied to the facial recognition system to calculate the depth map.

To generate the depth map, a depth processor equipped with a depth decoder is necessary. Filters of the depth decoder are configured to optimize input images for depth decoding. The quality of the generated depth map is determined according to the filter size.

SUMMARY

The invention is directed to a depth processor, capable of generating a depth map with a good quality.

An embodiment of the invention provides a depth processor including a ROI determination circuit and a depth decoder. The ROI determination circuit is configured to determine a size of a ROI of an input image. The depth decoder is coupled to the ROI determination circuit and configured to generate a depth map of the input image according to a filter size. The filter size is set according to the size of the ROI of the input image.

In an embodiment of the invention, the ROI determination circuit outputs a size information of the ROI of the input image to the depth decoder.

In an embodiment of the invention, the ROI of the input image includes a face of a user.

In an embodiment of the invention, the ROI determination circuit determines the size of the ROI of the input image according to a skin tone range.

In an embodiment of the invention, the input image is a two-dimensional image.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

FIG. 4 illustrates a look-up table including a relationship of ROI sizes, estimated distances and filter sizes according to an embodiment of the invention.

DESCRIPTION OF THE EMBODIMENTS

Figure 1:
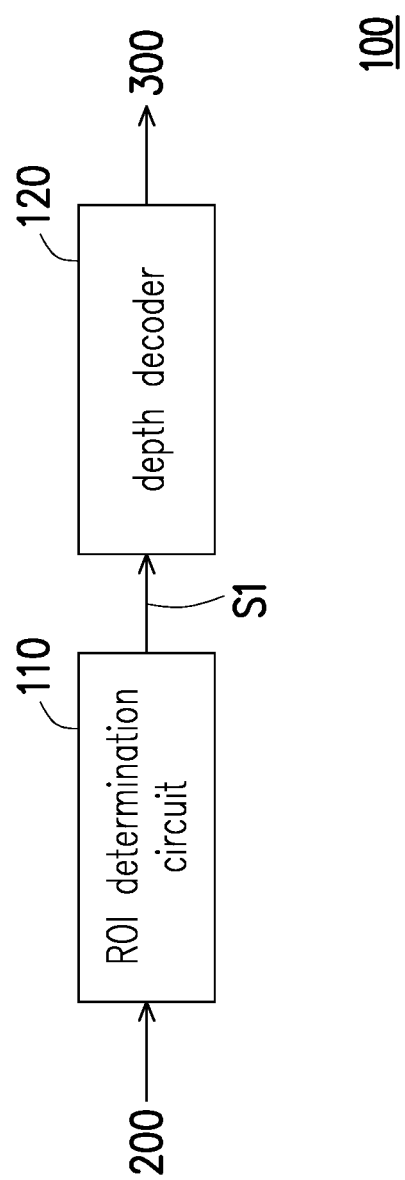
FIG. 1 is a block diagram illustrating a depth processor according to an embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

Figure 2:
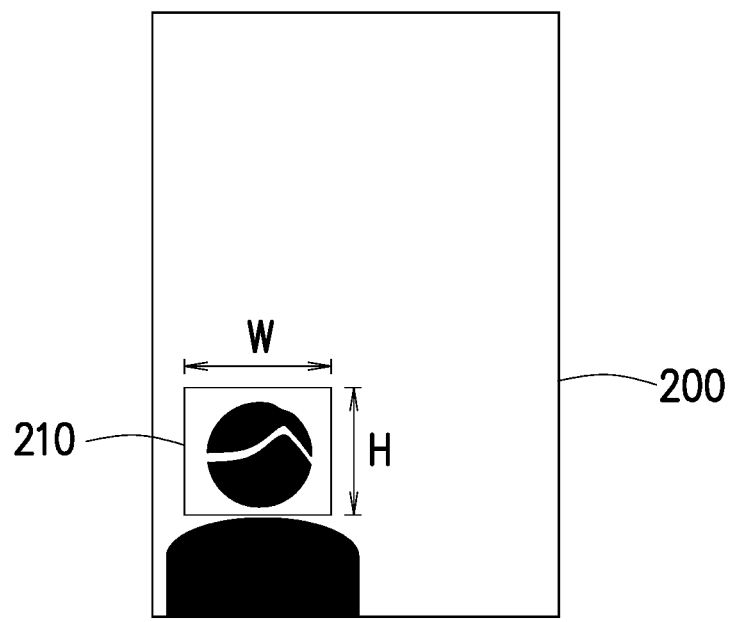
FIG. 2 is a schematic diagram illustrating an input image of FIG. 1 according to an embodiment of the invention.
Figure 3:
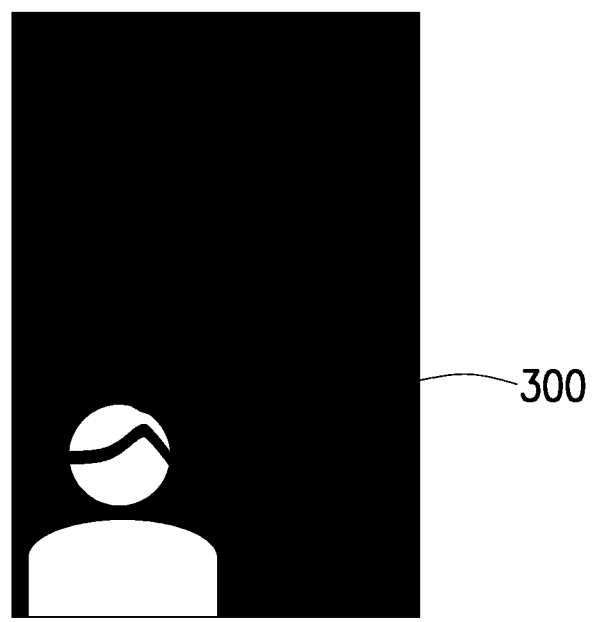
FIG. 3 is a schematic diagram illustrating a depth map of FIG. 1 according to an embodiment of the invention.

FIG. 1 is a block diagram illustrating a depth processor according to an embodiment of the invention. FIG. 2 is a schematic diagram illustrating an input image of FIG. 1 according to an embodiment of the invention. FIG. 3 is a schematic diagram illustrating a depth map of FIG. 1 according to an embodiment of the invention.

Referring to FIG. 1 to FIG. 3, the depth processor 100 is configured to receive the input image 200 from a camera and output the depth map 300 to a back-end system for facial recognition. In the present embodiment, the input image 200 is a two-dimensional image. The depth processor 100 includes a region of interest (ROI) determination circuit 110 and a depth decoder 120. The depth decoder 120 is coupled to the ROI determination circuit 110. The depth decoder 120 may include filters for optimizing images and depth decoding. The ROI determination circuit 110 is configured to determine a size of a ROI 210 of the input image 200. The depth decoder 120 is configured to generate the depth map 300 of the input image 200 according to a filter size. To generate a depth map with a good quality, the filter size of the depth decoder 120 is adaptively set according to the size of the ROI of the input image.

To be specific, the ROI determination circuit 110 receives the input image 200 from the camera and outputs a size information S1 of the ROI 210 of the input image 200 to the depth decoder 120. The size information S1 includes a height H and/or a width W of the ROI 210. In the present embodiment, the ROI 210 of the input image includes a face of a user. Accordingly, the ROI determination circuit 110 determines the size of the ROI 210 of the input image 200 according to a skin tone range. For example, the skin tone range may indicate that the region includes a face of a user. The ROI determination circuit 110 can determine whether a certain region is within the skin tone range according to an image resolution, an image brightness, an image spectral distribution, an image discrepancy, an image relevancy, an image color depth, an image sharpness or an image refresh rate. Therefore, the ROI determination circuit 110 determines the region within the skin tone range as the ROI 210 of the input image 200, and further determines the size of the ROI 210.

For decoding the input image 200, the depth decoder 120 sequentially processes a plurality of patch regions of the input image 200 by moving filters, and the patch size is the same as the filter size. The depth decoder 120 receives the size information S1 from the ROI determination circuit 110, and the filter size is set according to the size information S1. The filter size can be set by the depth decoder 120 itself or a controller connected to the depth decoder 120. The depth decoder 120 decodes the input image 200 according to the filter size to generate the depth map 300. FIG. 4 illustrates a look-up table including a relationship of ROI sizes, estimated distances and filter sizes according to an embodiment of the invention. The filter size can be adaptively set according to the look-up table as illustrated in FIG. 4. The units of the ROI size and the filter size are pixel units.

In the present embodiment, the circuit blocks of the depth processor 100 may be a hardware circuit designed through Hardware Description Language (HDL) or any other design methods for digital circuit well-known to persons with ordinary skill in the art and may be implemented in from of Field Programmable Gate Array (FPGA), Complex Programmable Logic Device (CPLD) or Application-specific Integrated Circuit (ASIC).

In summary, in the embodiments of the invention, the ROI determination circuit determines the size of the ROI and outputs the size information to the depth decoder. The filter size of the depth decoder is adaptively set according to the size of the ROI, and the depth decoder decodes the input image to generate the depth map according to the set filter size. Therefore, the depth map with a good quality can be generated.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A depth processor, comprising:
 a region of interest (ROI) determination circuit, configured to determine a size of a ROI of an input image; and
 a depth decoder, coupled to the ROI determination circuit and configured to generate a depth map of the input image according to a filter size, wherein the filter size is set according to the size of the ROI of the input image.

2. The depth processor of claim 1, wherein the ROI determination circuit outputs a size information of the ROI of the input image to the depth decoder.

3. The depth processor of claim 1, wherein the ROI of the input image comprises a face of a user.

4. The depth processor of claim 1, wherein the ROI determination circuit determines the size of the ROI of the input image according to a skin tone range.

5. The depth processor of claim 1, wherein the input image is a two-dimensional image.

* * * * *